United States Patent Office 2,832,752
Patented Apr. 29, 1958

2,832,752

HYDROCARBON MONOMERCAPTOESTERS AND VINYL HALIDE RESIN STABILIZED THEREWITH

Elliott L. Weinberg, Long Island City, N. Y., and Ernest W. Johnson, Westfield, N. J., assignors to Metal & Thermit Corporation, New York, N. Y., a corporation of New Jersey No Drawing. Application August 7, 1953
Serial No. 373,053

12 Claims. (Cl. 260—45.75)

This application is a continuation-in-part of our application Serial No. 232,878, filed June 21, 1951, and relates to organotin derivatives of mercapto compounds, to processes for manufacturing the same and to resin compositions containing these compounds as stabilizers.

With the present invention the new compounds may be designated as condensation products of certain organotin compounds with polycarboxylic mercapto acids and esters. These compounds may be designated as hydrocarbon tin derivatives of polycarboxylic mercapto acids and their esters containing the group

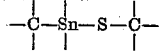

More particularly the compounds may be illustrated by the following formula

where R is aryl, alkyl or alkaryl such as methyl, ethyl, butyl, propyl, phenyl, tolyl, benzyl, etc.; R' is aliphatic hydrocarbon radical, R" is hydrogen, aryl, alkyl, alkaryl or cyclic, saturated or unsaturated, $m$ is an integer not less than 2, and $n$ may be 1, 2 or 3. Among the groups from which R" may be selected are isooctyl, 2-butyloctyl, butyl, cyclohexyl, dihydroabietyl, benzyl, phenyl, cresyl, allyl. Among the polycarboxylic acids and their esters which may be employed in this invention are thiomalic acid, α-mercaptoadipic acid and their appropriate esters.

These organotin derivatives are superior stabilizers for resins, particularly vinyl halide resins and this stabilizing property is equally applicable to resin-plasticizer compositions including the phosphate plasticizers.

The compounds may be prepared by any suitable manner. However, it has been found that the products may be prepared in high yield and purity by reacting an organotin compound with the polycarboxylic mercapto acids and mercapto acid esters and recovering a reaction product having the desired Sn—S linkage and ratio. More specifically, an organotin compound selected from the group consisting of organotin hydroxide, oxides and stannonic acids may be condensed with appropriate amounts of the polycarboxylic mercapto acid or ester to produce products having the structural formula set forth above. Further, organotin halides having the formula $RSnX_3$, $RSnX_2$ or $R_3SnX$, wherein X is a halide, such as chlorine, may be employed as the reactant with the polycarboxylic mercapto acids or esters. For optimum results it is preferable to conduct these reactions in the presence of basic substances or alkaline neutralizing agents (hydrogen ion acceptors) such as oxide, hydroxide, carbonate, tertiary amines (pyridine), or ammonia. These substances accept the hydrogen-ion formed during the condensation reaction and are not deleterious to the polycarboxylic mercapto acid or esters when used in the prescribed manner.

Any suitable reaction temperatures may be employed. It is ordinarily preferable, however, to use room or slightly elevated temperatures in the order of about 50° C.

The following examples are illustrative of these products and their preparations and it will be understood that the invention is not limited thereto.

*Example I*

Dibutyl thiomalate was prepared by reacting 100 gms. of thiomalic acid, with an excess of normal butyl alcohol. 1 gm. of para toluene-sulphonic acid was removed by washing with a 3% solution of sodium bicarbonate and then with water. After drying, the butyl alcohol was stripped from the dibutyl thiomalate. The ester analyzed 5.7% S. 12.45 gms. of dibutyltin oxide were added to 55.9 gms. of dibutyl thiomalate in 70 cc. of toluene. There was a very slight exothermic reaction. The water of reaction was removed and toluene was vacuum stripped. The residue (dibutyltin S,S' bis (dibutyl thiomalate) was a viscous amber liquid which analyzed 8.8% Sn, 4.7% S.

*Example II*

Thiomalic acid (87.0 gms.—0.50 mole) was dissolved in methyl alcohol (300 ml.). The solution was stirred while dibutyltin oxide (62.5 gms.—0.25 mole) was added. The oxide dissolved. The reaction was completed by distilling off the methyl alcohol and water of reaction in vacuo at a pot temperature of 105° C. and then placing the reaction product on a steam bath in an evaporating dish. The product, dibutyltin S,S' bis (thiomalic acid) was a grey, low-melting solid which analyzed 18.9% Sn, 11.3% S.

These organotin derivatives of polycarboxylic mercapto acid and esters function as excellent stabilizers for halogen containing resin compositions, particularly vinyl halide resin compositions containing plasticizers and when intermittently dispersed therein, will provide compositions of improved resistance to heat and light deterioration.

The resin compositions containing these stabilizers may be prepared in accordance with the method set forth in my application Serial No. 232,878, now Patent 2,648,650.

An example of the performance of these stabilizers is shown in the following table compared to the resin incorporating a dibutyltin dilaurate stabilizer and an unstabilized resin. The resin used is polyvinylchloride homopolymer resin, which is sold commercially under the trade names "Geon 101" and "Ultron 300."

| Composition | | | Appearance after heat aging | | | |
|---|---|---|---|---|---|---|
| Stabilizer | 100 parts resin | Plasticizer | 1 hr. | 2 hrs. | 3 hrs. | 4 hrs. |
| None | Geon 101 | 80 parts dioctylphthalate. | reddish brown | black | | |
| 2 parts dibutyltin dilaurate. | do | do | yellow | red-brown | black | |
| 1 part Ex. I | Ultron 300 | do | very slight yellow. | v. s. y. | v. s. y. | s. y. |

What we wish to claim is:

1. Dibutyltin S,S' bis(dibutyl thiomalate).
2. Dibutyltin S,S' bis(thiomalic acid).
3. A composition comprising vinyl halide resin with a stabilizing amount of the compound set forth in claim 1.
4. A method of preparing dibutyltin S,S' bis (dibutyl thiomalate) which comprises reacting dibutyltin oxide with the dibutyl ester of thiomalic acid and recovering the reaction product.
5. A method of preparing dibutyltin S,S' bis (thiomalic acid) which comprises reacting dibutyltin oxide with thiomalic acid and recovering the reaction product.
6. As a composition of matter a hydrocarbontin monomercapto substituted aliphatic dicarboxylic acid derivative having the formula $R_n Sn[S—R'(COOR'')_2]_{4-n}$ wherein $n$ is an integer from 1 to 3, R is a hydrocarbon radical selected from the class consisting of aryl, alkyl and aralkyl radicals, R' is a trivalent saturated aliphatic hydrocarbon radical and R'' is selected from the class consisting of hydrogen, and the alkyl, aryl and aralkyl hydrocarbon radicals, and wherein the sulfur atom is bonded to a carbon atom which is α to a COOR'' group.
7. A composition according to claim 6 wherein R and R'' are alkyl, and R' is the trivalent radical

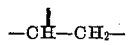

8. A method of preparing compounds defined in claim 6 which comprises reacting a hydrocarbontin oxide, whose hydrocarbon groups are selected from the class consisting of aryl, aralkyl and alkyl radicals, with an α monomercapto substituted aliphatic dicarboxylic acid derivative of formula $HSR'(COOR'')_2$ wherein R'' is selected from the group consisting of hydrogen, alkyl, aryl and aralkyl radicals and R' is a trivalent saturated aliphatic hydrocarbon radical, and recovering the reaction product.
9. A method according to claim 8, wherein said α monomercapto substituted aliphatic dicarboxylic acid derivative is thiomalic acid and said hydrocarbontin compound is an alkyltin oxide.
10. A method according to claim 8, wherein said α monomercapto substituted aliphatic dicarboxylic acid derivative is an alkyl ester of thiomalic acid and said hydrocarbontin compound is an alkyltin oxide.
11. A composition comprising a vinyl halide resin with a stabilizing amount of hydrocarbontin monomercapto substituted aliphatic dicarboxylic acid ester derivative of formula $R_n Sn[S—R'(COOR'')_2]_{4-n}$ wherein $n$ is an integer from 1 to 3, R and R'' are hydrocarbon radicals selected from the class consisting of aryl, alkyl, and aralkyl radicals, R' is a trivalent saturated aliphatic hydrocarbon radical, and wherein the sulfur atom is bonded to a carbon atom which is α to a COOR'' group.
12. A composition according to claim 11 wherein the vinyl halide resin is a vinyl chloride resin, R and R'' are alkyl and R' is the trivalent radical

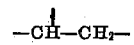

References Cited in the file of this patent
UNITED STATES PATENTS

| | | |
|---|---|---|
| 2,597,920 | Carroll | May 27, 1952 |
| 2,648,650 | Weinberg et al. | Aug. 11, 1953 |